Feb. 21, 1967  E. W. CAUFFMAN  3,304,915
ROTARY DIVERTER FOR LIVESTOCK FEEDER
Filed Aug. 4, 1965  3 Sheets-Sheet 1
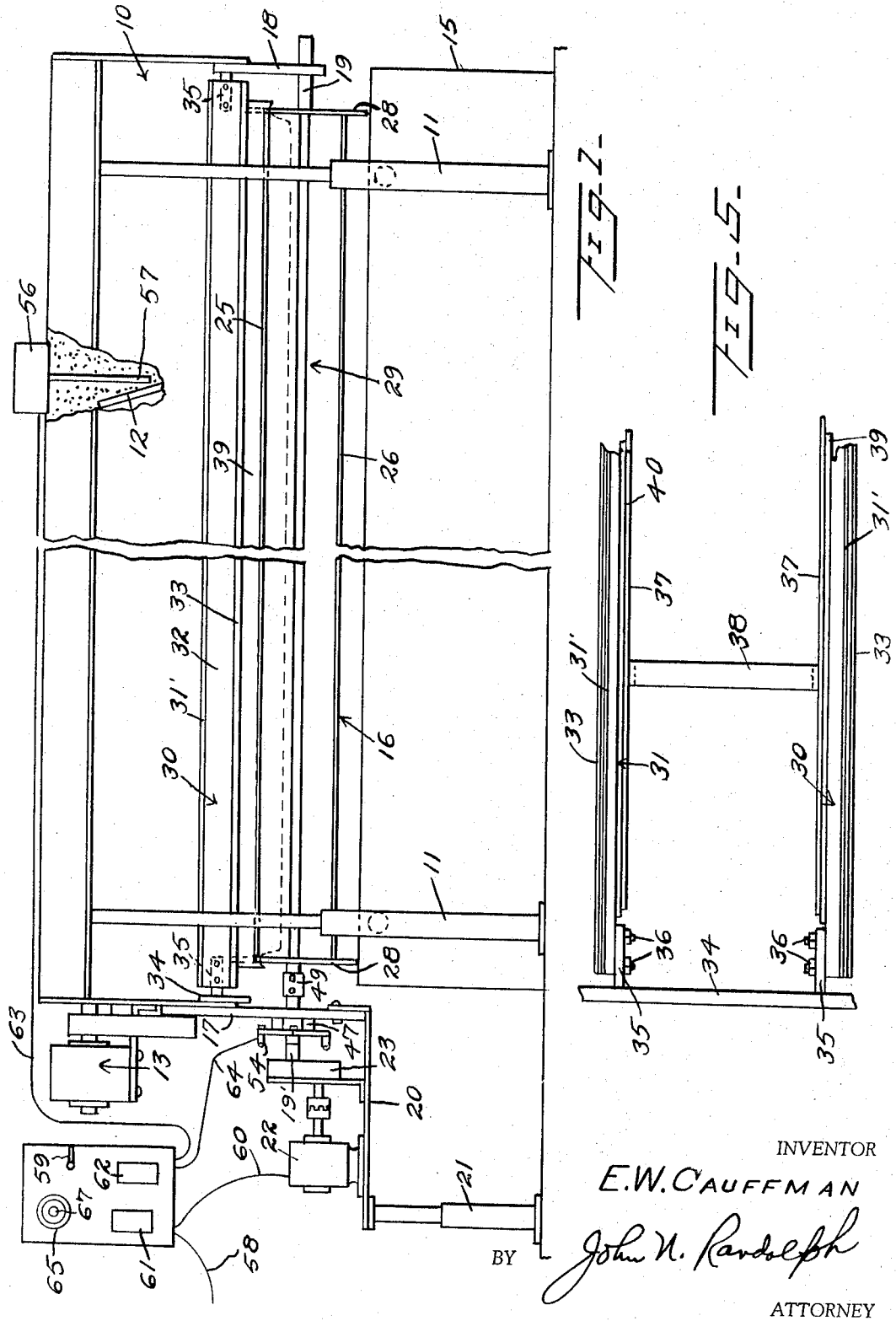
INVENTOR
E.W. CAUFFMAN
BY John N. Randolph
ATTORNEY

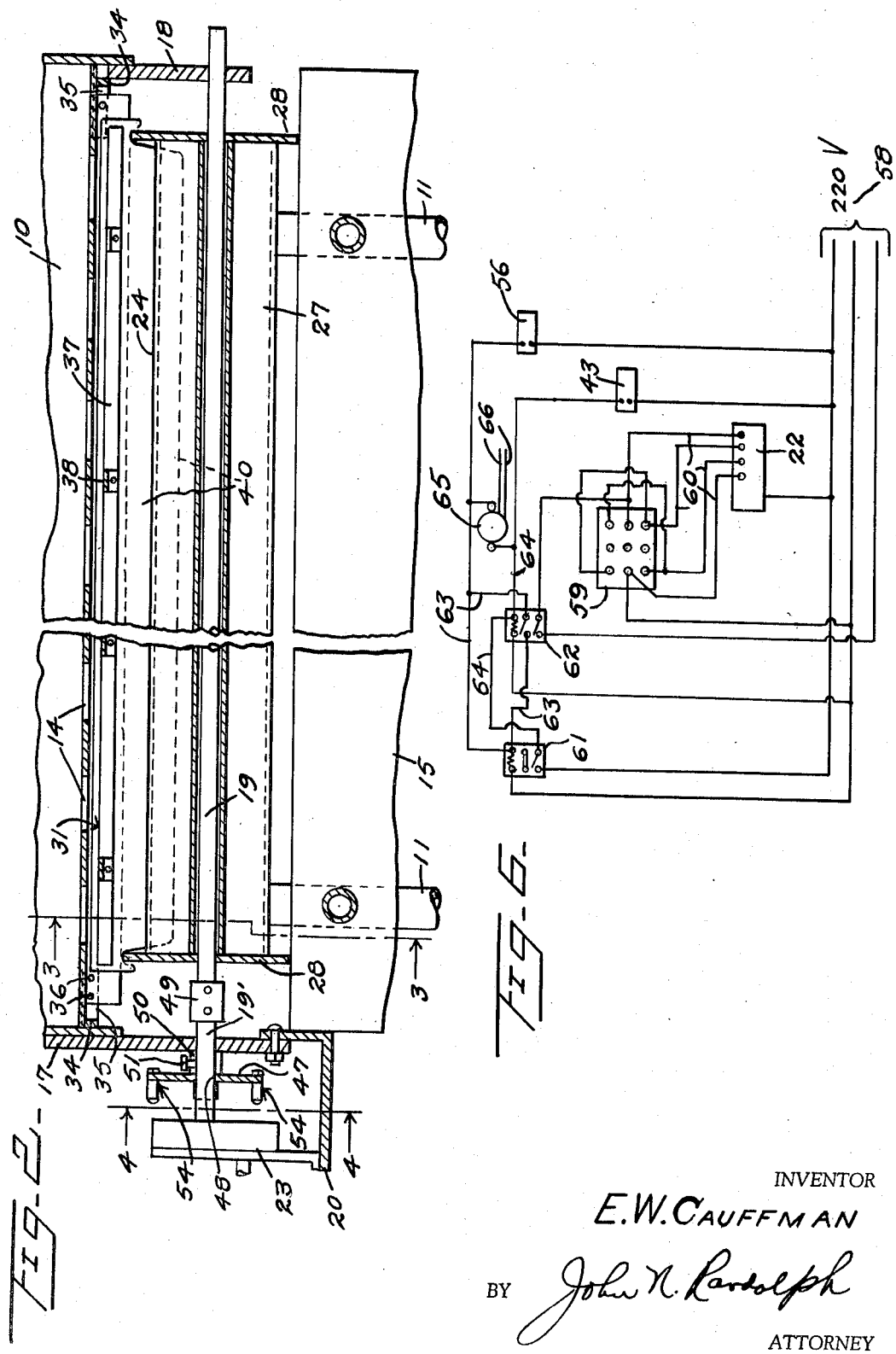

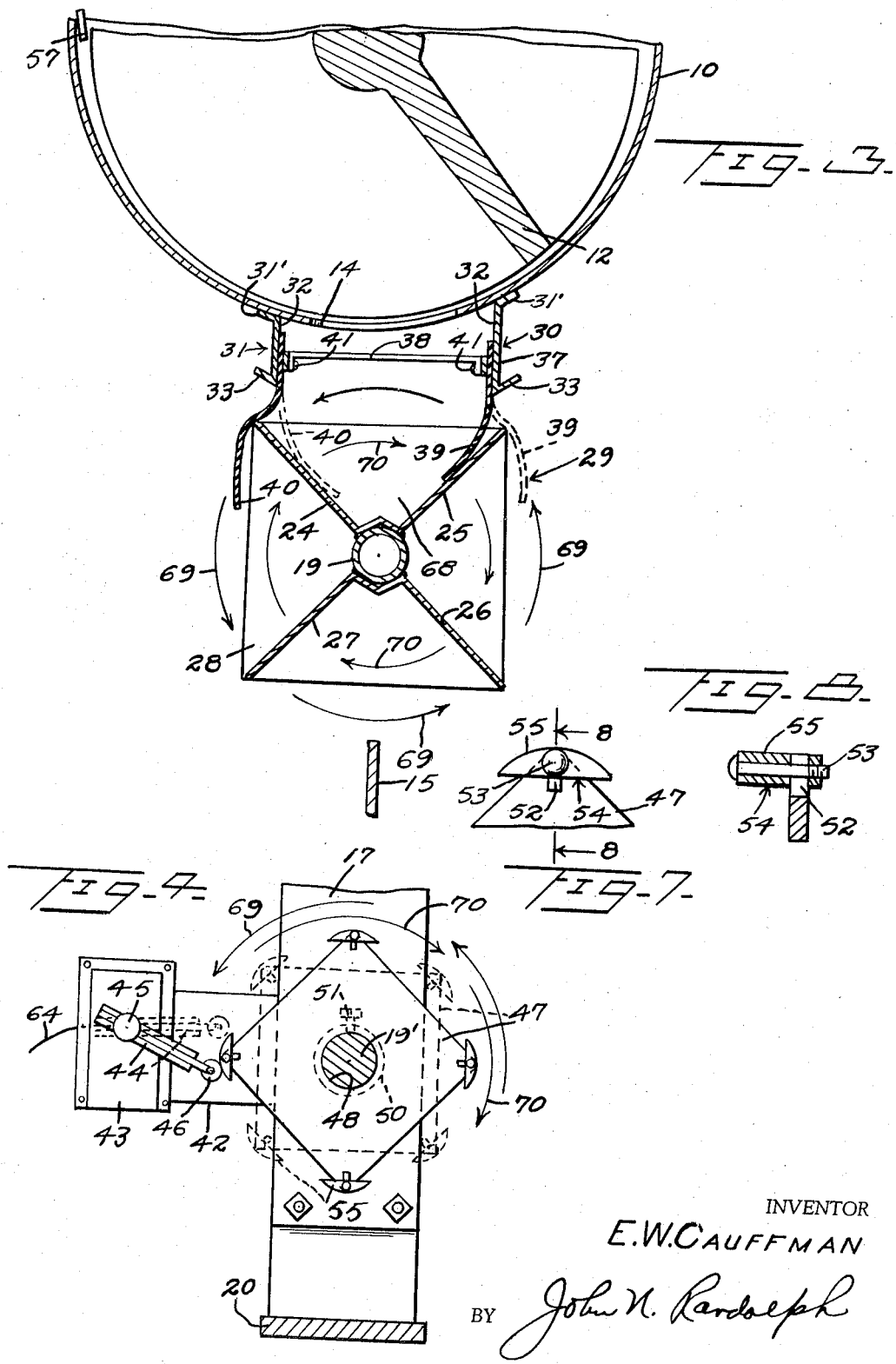

United States Patent Office 3,304,915
Patented Feb. 21, 1967

3,304,915
ROTARY DIVERTER FOR LIVESTOCK FEEDER
Eugene W. Cauffman, Claypool, Ind., assignor to Parker Feeders, Inc., Silver Lake, Ind., a corporation of Indiana
Filed Aug. 4, 1965, Ser. No. 477,127
4 Claims. (Cl. 119—56)

This invention relates to a rotary diverter for use with a livestock feeder for accurately controlling the amount of feed delivered to either side of a feed bunk.

An object of the invention is to provide a rotary diverter which will enable different rations or kinds of feed to be delivered to each side of a feed bunk.

A further object of the invention is to provide a rotary diverter which will effectively control and measure the amount of material or feed which is delivered to each side of the feed bunk.

Various other objects and advantages of the invention will hereinafter become more fully apparent from the following description of the drawings, illustrating a presently preferred embodiment thereof, and wherein:

FIGURE 1 is a fragmentary side elevational view partly broken away showing the rotary diverter utilized with a conventional feeder;

FIGURE 2 is an enlarged substantially central fragmentary sectional view of the rotary diverter and associated parts;

FIGURE 3 is an enlarged fragmentary cross sectional view of the rotary diverter, taken substantially along the line 3—3 of FIGURE 2;

FIGURE 4 is an enlarged fragmentary cross sectional view taken substantially along a plane as indicated by the line 4—4 of FIGURE 2;

FIGURE 5 is an enlarged fragmentary top plan view of a draper assembly of the rotary diverter shown detached from the feeder;

FIGURE 6 is a diagrammatic view illustrating an electric circuit for use in controlling the rotary diverter;

FIGURE 7 is an enlarged fragmentary side elevational view of a part of the timing cam, and FIGURE 8 is a radial sectional view thereof, taken substantially along a plane as indicated by the line 8—8 of FIGURE 7.

Referring more specifically to the drawings, a conventional feeder trough 10 is supported by a plurality of longtiudinally spaced stands 11 with its axis in substantially a horizontal plane. The trough 10 contains a spiral screw conveyor 12 which is driven by a conventional power unit 13 which is located beyond an end of the trough 10. The bottom of the trough 10 is provided with a plurality of longitudinally spaced discharge openings 14, as best seen in FIGURE 3 (in which view the spiral conveyor 12 is omitted for the sake of clarity). A divider board 15 is supported by the stands 11 beneath and spaced from the trough 10. The divider board 15 extends substantially from end-to-end of the trough 10 and is disposed in approximately the same vertical plane as the axis of said trough, as seen in FIGURE 3.

The rotary diverter, designated generally 16 and comprising the invention, includes hangers 17 and 18 which are secured to and depend from the ends of the trough 10 and which provide journals for a shaft 19. A platform 20 has an outer end supported by a stand 21 and an inner end which is supported by the hanger 17. An electric motor 22 is mounted on the platform 20 and is connected to a section 19' of the shaft 19 by a reduction gear unit 23 which is also supported by said platform.

As best seen in FIGURE 3, four vanes 24, 25, 26 and 27 are fixed to and extend radially from the shaft 19, from their inner to their outer longitudinal edges, and each of the vanes is of a length to extend between two plates 28 which are mounted on and fixed to the shaft 19 and which are disposed between and adjacent the hanger bearings 17 and 18, and to which the ends of the vanes are connected in any conventional manner. The shaft 19, vanes 24–27, and plates 28 constitute the rotary diverter unit 29 which is disposed between the bottom of the trough 10 and the upper edge of the divider board 15. Each of the vanes is disposed at right angles to the two vanes between which it is located.

A pair of drapery hangers 30 and 31 depend from the lower portion of the trough 10 in straddling relation to the discharge openings 14 and each of said hangers includes an outwardly flared top flange 31' which bears against the outer side of the trough bottom, a depending substantially vertical intermediate portion 32 and an outwardly extending and upwardly inclined bottom flange 33. Hanger supporting plates 34 are secured to the end flanges of the feeder trough 10 and have inwardly extending bracket arms 35, as best seen in FIGURE 5, which are secured by fastenings 36 to the ends of the drapery hangers 30 and 31. Mounting strips 37 are disposed between the hangers 30 and 31 and extend to adjacent the bracket arms 35 and said mounting strips are connected together at a plurality of longitudinally spaced points by cross braces 38. Flexible strips forming draperies 39 and 40 have upper portions disposed between the intermediate hanger portions 32 and the mounting strips 37, as seen in FIGURE 3, and which are clamped therein by fastenings 41 which connect the crossbraces 38 to the mounting strips and the hanger portions 32. The drapery 39 depends from the inner side of the hanger 30 and the drapery 40 depends from the inner side of the hanger 31, as seen in FIGURE 3. The crossbraces 38 are located so as to be disposed between the discharge openings 14.

A bracket 42 extends laterally from one side edge of the hanger 17 to support an electric switch 43 (FIGURE 4). The switch 43 has an actuating arm 44 which is pivotally mounted to swing in a vertical plane about an horizontal axis 45. A roller 46 is journaled on an end of the arm 44 which is disposed remote from the axis 45.

A square plate 47 has a central opening 48 to receive the section 19' of the shaft 19 which extends from the reduction gear unit 23 through the bearing 17, beyond which it is connected to an adjacent end of the shaft 19 by a coupling 49, as seen in FIGURE 2. The plate 47 is disposed between the reduction gear unit 23 and the bearing 17, and a collar 50 is fixed to one side of the plate 47 around its opening 48 and is disposed between said plate and the bearing hanger 17. A setscrew 51 threadedly engages in the collar 50 and is adapted to be tightened for clamping the collar 50 and plate 47 adjustably to the shaft section 19'. As best seen in FIGURES 7 and 8, each of the four corners of the plate 47 has a radial slot 52 to receive a part of the bolt and nut fastening which extends through an intermediate portion of an elongated cam 54 which is disposed crosswise of a corner of the plate 47 and which is mounted by the fastening 53. Each cam 54 has a convexly bowed outer side 55 extending from end-to-end thereof and forming its cam surface. The cams 54 are mounted on the opposite side of the plate 47 from the collar 50 and are disposed so that the roller 46 is in the paths of movement of the cams when the plate 47 revolves with the shafts 19 and 19'.

An electric switch 56 is mounted on the rim of the trough 10 at one side thereof and remote from the power unit 13, as seen in FIGURE 1, and has an actuating wand or rod 57 extending downwardly into said side of the trough and which is disposed on one side of the screw conveyor 12, as seen in FIGURE 3. The switches 43, 56 and the electric motor 22 are interposed in an electric circuit, as illustrated in FIGURE 6, which is connected to a 220 volt source of electric current 58. The electric circuit includes a manually actuated reversing switch 59 which is connected by conductors 60 to the motor 22; a delay solenoid 61 and a solenoid and relay switch 62 both of which are connected to the limit switch 56 by conductors 63 and to the limit switch 43 by conductors 64. An impulse counter 65 is connected to the conductors 63 and 64 and has conductors 66 leading therefrom which may be connected to a feed shut-off, not shown, or to an audible or visual warning signal.

The impulse counter includes a knob 67, as seen in FIGURE 1, which can be manually turned to the desired number of one-quarter turns that the shafts 19 and 19' will be driven by the motor 22 before the counter 65 pulsates itself back to its zero position, which energizes the circuit of the wiring 66 for producing the audible or visual signal or for shutting off the supply of feed to the trough 10.

The feed is discharged into the trough 10 from a source of supply, not shown, and is conveyed by the screw conveyor 12 from left to right of said trough, as seen in FIGURE 1. Assuming that the rotary diverter unit 29 is disposed as seen in FIGURE 3, and that the timing cam 47, 54 is positioned as seen in FIGURE 4, the feed, not shown, will be discharged by gravity through the discharge ports 14 into the V-shaped pocket 68 formed by the two upwardly diverging vanes 24 and 25, the draperies 39 and 40 and the drapery hangers 30 and 31. When this pocket becomes filled to the ends thereof as defined by plates 28, the feed will accumulate in the trough 10 and will press against the wand 57 as the feed is forced toward the right hand end of the trough, as seen in FIGURE 1. This will deflect the wand 57 from left to right for opening the switch 56 to de-energize relay 61 to close the electric circuit of the motor 22. Assuming that the switch 59 is set to cause the motor 22 to turn the shafts 19 and 19' counterclockwise, as indicated by the arrows 69 in FIGURES 3 and 4, the rotary diverter 29 and the timing cam 47, 54 will commence to turn counterclockwise from their positions of FIGURES 3 and 4, respectively. At the beginning of this turning movement, one of the cams 54 is engaging the roller 46 and holding the switch actuating arm 44 in its full line circuit breaking position. The delay solenoid 61 functions upon opening of the switch 56 to maintain the electric circuit of the motor 22 energized until the shafts 19 and 19' have each turned sufficiently in a counterclockwise direction so that the cam 54 which was engaging the roller 46 will have moved out of engagement therewith to allow the actuating arm 44 to snap upwardly toward its dotted line position, for closing the switch 43 and thereby maintain the motor 22 energized after the solenoid 61 has ceased to perform this function.

After the pocket 68 has turned counterclockwise slightly more than one-eighth of a revolution, the drapery 40 will have disengaged the vane 24 and the feed contained in the pocket 68 will have begun to discharge from said pocket into the bunk on the left hand side of the divider board 15, as seen in FIGURE 3.

Shortly thereafter and when the vane 25 has moved slightly past a top dead center position, the drapery 39 will be disengaged from the vane 25. Prior to this time, the drapery 39 being to the left of the vane 25, as seen in full lines, will have prevented any of the feed from escaping from the pocket 68 over said vane 25. By the time that the pocket 68 completes its one-quarter counterclockwise rotation, so that the vane 24 will have assumed the position that the vane 27 is disposed in FIGURE 3, all of the feed will have been discharged from the pocket 68 to the left of the divider board 15 and the vanes 25 and 26 will then have assumed the positions of the vanes 24 and 25, respectively, to define another upwardly opening V-shaped pocket, and the draperies 39 and 40 will be in their full line positions of FIGURE 3 for then engaging the vanes 25 and 26, respectively. Before the vanes 25 and 26 have completely reached this position, resulting from the one-quarter counterclockwise rotation of the diverter unit 29, the feed will have been discharged from the outlet ports 14 into the pocket formed by the vanes 25 and 26 and the feed will have disengaged the wand 57 to allow the switch 56 to resume its closed position, with the circuit of the motor 22 then being maintained closed solely by the switch 43, just prior to the diverter 29 completing its one-quarter revolution. During the discharge of the feed from the pocket 68, the conveyor 12 continues to move the feed toward the right hand end of the trough 10, as seen in FIGURE 1, but as soon as the pocket formed by the vanes 25 and 26 is brought into communication with the discharge ports 14 by the drapery 39 passing over the outer edge of the vane 25, feed will be discharged rapidly from the trough 10 into this pocket.

As the shafts 19 and 19' complete their one-quarter counterclockwise rotation, the cam 54 which was previously located at the top of the plate 47 will have engaged the roller 46 and will have swung the arm 44 back to its full line position for breaking the electric circuit to the motor 22. The aforedescribed operation will be repeated until the counter 65 has pulsated itself back to its zero position, for discharging the desired quantity of feed to the bunk located at the left of the divider board 15.

The counter 65 can then be reset and the reversing switch 59 can be manually adjusted for causing the rotary diverter 29 to turn clockwise and the timing cam 47, 54 will also turn clockwise, as indicated by the arrow 70 in FIGURES 3 and 4. The feed will then be dispensed to the other bunk on the right hand side of the divider board 15. The draperies 39 and 40 assume their dotted line positions of FIGURE 3 when the diverter 29 is operated clockwise. The cams 54 will engage the roller 46 in its dotted line position of FIGURE 4, and each cam will travel upwardly beneath the roller 46 until the roller rides off of its cam surface 55 and snaps downwardly to a position for closing the switch 43 and for holding said switch closed until the cam surface 55 of the next cam 54 moves upwardly and returns the arm 44 and roller 46 to their dotted line circuit breaking position.

It will thus be seen that not only measured and different amounts of feed may be dispensed automatically to the left and right hand bunks, but it will also be apparent that different types of feed may be supplied to the different bunks.

The draperies 39 and 40 in addition to preventing escape of the feed improperly from the V-shaped pockets, as heretofore described, also protect the livestock from injuring their tongues due to the shearing action of the moving vanes.

Various modifications and changes are contemplated and may obviously be resorted to without departing from the function or scope of the invention, as hereinafter defined by the appended claims.

I claim as my invention:

1. In combination with an elongated feeder trough having a discharge opening in the bottom thereof, a conveyor operating in the trough for conveying feed to the discharge opening, and a divider board disposed in a vertical plane beneath and spaced from the trough; a rotary diverter disposed betwen the trough and divider board including a plurality of pockets of V-shaped cross section connected together to revolve about an axis disposed substantially parallel to the axis of the trough, and means for intermittently turning the rotary diverter in either direction whereby the pockets will successively assume and dwell in an upright loading position beneath the discharge opening to receive feed from the trough and will thereafter turn to a gravity discharging position for supplying the feed to a bunk on either side of the divider board and while another pocket is in a loading position a shaft constituting said axis of the diverter, vanes connected to and extending radially from the shaft, adjacent ones of the vanes combining to form the pockets, and flexible drapery members depending from the trough and straddling the discharge opening, said drapery members extending substantially below upper edge portions of the vanes of the loading pocket and engaging said vanes for confining the feed therein while said pocket is in a loading position and during the movement to a partial discharging position of the loading pocket.

2. In combination with an elongated feeder trough having a discharge opening in the bottom thereof, a conveyor operating in the trough for conveying feed to the discharge opening, and a divider board disposed in a vertical plane beneath and spaced from the trough; a rotary diverter disposed between the trough and divider board including a plurality of pockets of V-shaped cross section connected together to revolve about an axis disposed substantially parallel to the axis of the trough, and means for intermittently turning the rotary diverter in either direction whereby the pockets will successively assume and dwell in an upright loading position beneath the discharge opening to receive feed from the trough and will thereafter turn to a gravity discharging position for supplying the feed to a bunk on either side of the divider board and while another pocket is in a loading position a shaft constituting said axis of the diverter, vanes connected to and extending radially from the shaft, adjacent ones of the vanes combining to form the pockets, and flexible drapery members depending from the trough and straddling the discharge opening, one of said drapery members engaging the inner side of the trailing vane of the loading pocket and the other drapery member engaging the outer side of the leading vane of said pocket for confining feed therein while said pocket is in a loading position.

3. In a combination as defined by claim 2, and drapery supports secured to the trough and suspending the drapery members therefrom.

4. In a combination as defined by claim 2, and said rotary diverter including means for closing the ends of the pockets and which are disposed between the ends of said drapery members.

References Cited by the Examiner

UNITED STATES PATENTS

| | | | |
|---|---|---|---|
| 1,572,981 | 2/1926 | Aldrich et al. | 119—56 |
| 3,029,925 | 4/1962 | Martin et al. | 119—52 X |
| 3,088,437 | 5/1963 | Willems | 119—56 |
| 3,234,913 | 2/1966 | Haen et al. | 119—56 |

FOREIGN PATENTS 221,005   9/1924   Great Britain.

SAMUEL KOREN, *Primary Examiner.*

HUGH R. CHAMBLEE, *Examiner.*